M. J. B. BARBAROU.
SPEED REDUCING GEAR FOR AVIATION MOTORS.
APPLICATION FILED JAN. 3, 1921.
1,438,289.
Patented Dec. 12, 1922.
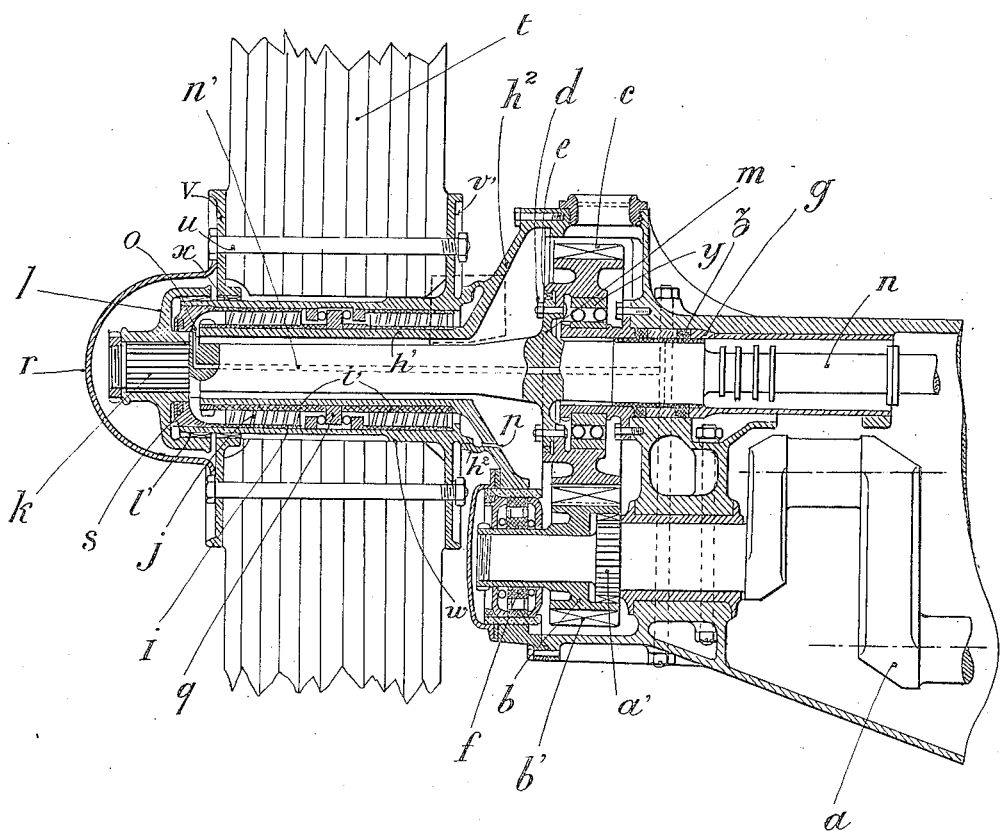
INVENTOR:
Marius Jean Baptiste Barbarou.
By
his ATTORNEY.

Patented Dec. 12, 1922.

1,438,289

UNITED STATES PATENT OFFICE.

MARIUS JEAN BAPTISTE BARBAROU, OF PARIS, FRANCE.

SPEED-REDUCING GEAR FOR AVIATION MOTORS.

Application filed January 3, 1921. Serial No. 434,498.

*To all whom it may concern:*

Be it known that I, MARIUS JEAN BAPTISTE BARBAROU, a citizen of the French Republic, residing at Paris, in the Republic of France, have invented new and useful Improvements in Speed-Reducing Gears for Aviation Motors, of which the following is a specification.

This invention has for its object an improved construction of speed reducing gear for aviation motors.

The improved construction has the advantage that it obviates the transmission of the thrust of the propeller upon the shaft actuating the same, and on the other hand, in the case in which for any reason the propeller is not perfectly equilibrated, either in the sense of the pitch or from the standpoint of centrifugal force, it relieves the driving shaft of the efforts resulting from these inequalities which have the effect of fatiguing the same and of tending to modify the distances between the axes of the gear wheels, which places the latter under defective conditions as regards strength and noiseless running.

The accompanying drawing shows by way of example an embodiment of the device according to the invention.

The crank shaft $a$ terminates at its front part in a toothed rim $a'$ provided with a cylindrical extension, and upon this cylindrical extension is centered a pinion $b$ which carries, independently of the teeth $b'$ engaging with the reducing gear $c$, an internal toothed portion in engagement with the toothed portion $a'$ of the crank shaft.

To maintain the position of the crank shaft in the longitudinal sense, there is provided a thrust bearing $f$ with a double row of balls, whose central ring serves as a supporting bearing to obviate all bending of this part of the shaft.

The reducing gear $c$ is secured upon the cam shaft $n$ by means of the bolts $d$, and a disc $m$ integral with the cam shaft carries at its outer part a toothed portion $e$ which engages a similar toothing cut in the pinion $c$.

In order to support the thrust of the gear $c$, this latter carries a ball bearing $y$ which is centered at the end of a steel tube $g$ solidly fixed to the crank case of the motor, this bearing is completed on the other hand by a smooth bearing $z$ which directly supports the cam shaft. Upon the front face of the motor is secured the propeller carrying nose $h$, which is centered around the axis of the cam shaft and has an enlarged portion for supporting the bearing $f$ for the crank shaft. Upon the cylindrical extension $h'$ of the nose $h$, are mounted rings $i'$ of hard steel or cementation steel having rolling thereupon rollers $j$ which may be formed, as shown in the drawing, by a spring or in a single piece.

The rollers $j$ run in sleeves $i$ which are also of hard steel.

In order to withstand the thrust of the propeller a thrust bearing $q$ with a double row of balls is provided at the central part of the extension $h'$ between the two rows of rollers.

The propeller is driven in the following manner:

The end of the cam shaft is provided with flutes $k$ having fitting thereupon a cap $l$ provided with teeth $l'$ which engage similar teeth provided on the hub $w$ of the propeller.

The propeller $t$ is clamped between the two cheeks $v$, $v'$ of the hub, which are connected by bolts $u$ extending through the propeller. The front cheek $v$ is also in engagement with the body of the hub by flutes $x$ in order to provide for a positive drive at both sides of the propeller.

The lubrication is carried out in the following manner: the oil under pressure arriving at the smooth bearing $z$ of the cam shaft is taken up by the duct $n'$ and flows off through the orifice $o$ into the bearing chamber. Thence, after having lubricated the roller bearing $j$ and the thrust-bearing $q$, it returns to the crank case through the orifice $p$. The nose $h$ is provided with a flange $h^2$ in contact with the propeller hub and adapted to take up the oil.

A felt washer $s$ is provided to prevent the oil from escaping at the front outside the bearing chamber.

A protecting cover $r$ is disposed at the front part of the propeller hub.

Having now described my invention, I declare that what I claim as new and desire to secure by Letters Patent is:

1. A speed reducing gear for aviation motors comprising an engine frame, a crank shaft rotatably supported in said frame, a driving pinion keyed on said crank shaft, a receiving pinion meshing with the driving pinion and having a larger diameter than the latter, a cam shaft upon which said receiving pinion is secured, a supporting nose secured to the engine frame and concentric with the cam shaft, a propeller hub, a propeller secured to said hub, means for rotatably supporting said propeller hub on the nose, means for preventing any axial displacement of the hub on the nose, keys formed on the end of the cam shaft, teeth formed on the propeller hub and a cap in operative engagement with said keys and teeth.

2. A speed reducing gear for aviation motors comprising an engine frame, a crank shaft rotatably supported in said frame, a driving pinion keyed on said crank shaft, a receiving pinion meshing with the driving pinion and having a larger diameter than the latter, a cam shaft upon which said receiving pinion is secured, a supporting nose secured to the engine frame and concentric with the cam shaft, a propeller hub, embodying a hub body and a removable cheek, teeth formed on said hub body, teeth formed on the removable cheek and engaging with said first mentioned teeth, means for rotatably supporting said hub body on the nose, means for preventing any axial displacement of the hub body on the nose, keys formed on the end of the cam shaft, teeth formed on the hub body and a cap in operative engagement with said keys and teeth.

3. A speed reducing gear for aviation motors comprising an engine frame, a crank shaft supported in said frame, a driving pinion keyed on said crank shaft, a receiving pinion meshing with the driving pinion and having a larger diameter than the latter, a cam shaft upon which said receiving pinion is secured, a supporting nose secured to the engine frame and concentric with the cam shaft, a propeller hub, a propeller secured to said hub, means for rotatably supporting said propeller hub on the nose, means for preventing any axial displacement of the hub on the nose, means for operatively connecting the cam shaft to the propeller hub, and an oil retaining flange on the nose, in contact with the propeller hub, the nose being provided with a hole for the return of the lubricating oil into the engine frame.

In testimony whereof I have signed my name to this specification.

MARIUS JEAN BAPTISTE BARBAROU.